US011506911B2

(12) United States Patent
Samid

(10) Patent No.: US 11,506,911 B2
(45) Date of Patent: Nov. 22, 2022

(54) APPLICATIONS OF THE SHAPELESS (ENTROPIC) ALPHABET

(71) Applicant: Gideon Samid, Rockville, MD (US)

(72) Inventor: Gideon Samid, Rockville, MD (US)

(*) Notice: Subject to any disclaimer, the term of this patent is extended or adjusted under 35 U.S.C. 154(b) by 14 days.

(21) Appl. No.: 17/372,479

(22) Filed: Jul. 11, 2021

(65) Prior Publication Data
US 2022/0019088 A1 Jan. 20, 2022

Related U.S. Application Data

(63) Continuation-in-part of application No. 16/997,819, filed on Aug. 19, 2020, now Pat. No. 11,062,187.

(60) Provisional application No. 63/051,652, filed on Jul. 14, 2020.

(51) Int. Cl.
G06K 19/06 (2006.01)
G02B 30/56 (2020.01)
H04L 9/08 (2006.01)
H04L 9/06 (2006.01)
B42D 25/378 (2014.01)
B42D 25/351 (2014.01)
B01F 25/451 (2022.01)
B01F 101/30 (2022.01)

(52) U.S. Cl.
CPC ............ *G02B 30/56* (2020.01); *B01F 25/451* (2022.01); *B42D 25/351* (2014.10); *B42D 25/378* (2014.10); *H04L 9/0618* (2013.01); *H04L 9/0825* (2013.01); *B01F 2101/30* (2022.01)

(58) Field of Classification Search
CPC .............. B01F 2215/005; B01F 5/0077; B01F 5/0603; B01F 5/0608; B01F 5/0665; B01F 5/0682; B01F 5/0688; B01F 5/069; B01F 7/0075; B01F 7/00908; G06K 19/06037; G06K 19/06046
See application file for complete search history.

(56) References Cited

U.S. PATENT DOCUMENTS

| | | | |
|---|---|---|---|
| 2010/0183225 A1* | 7/2010 | Vantaram | G06T 7/155 382/173 |
| 2010/0250497 A1* | 9/2010 | Redlich | H04L 63/0227 707/661 |
| 2010/0287382 A1* | 11/2010 | Gyorffy | G06F 21/36 713/185 |
| 2011/0263688 A1* | 10/2011 | Barany | C07D 309/30 514/44 R |
| 2013/0311348 A1* | 11/2013 | Samid | G06Q 40/04 705/37 |
| 2014/0337880 A1* | 11/2014 | Sorbel | H04N 21/8146 725/34 |
| 2019/0066852 A1* | 2/2019 | Irwin | G21B 3/002 |

* cited by examiner

Primary Examiner — Thien M Le

(57) ABSTRACT

A variety of applications exploiting the Shapeless language where the geometry of letters is immaterial; their size and proximity deliver their message. These applications span rescue effort, industrial practice, painting, food preparation, authentication of documents, etc. Shapeless language is computer readable and very robust.

11 Claims, 25 Drawing Sheets

Slicing Round of a three ingredients entropic mixing

Fig-1a Entropic Reading Illustration [parts (a),(b),(c),(d)]
(a)
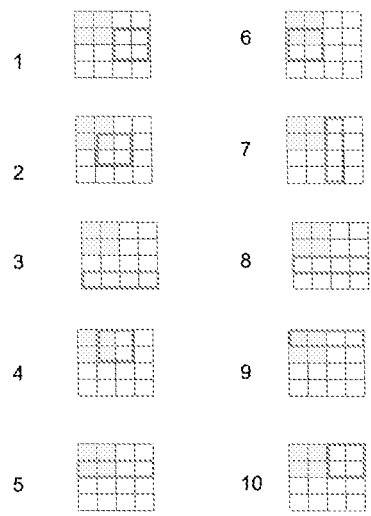
(b)
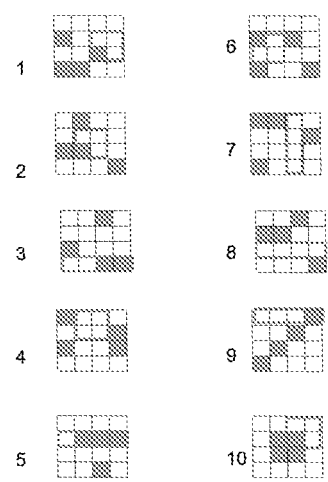
(c)
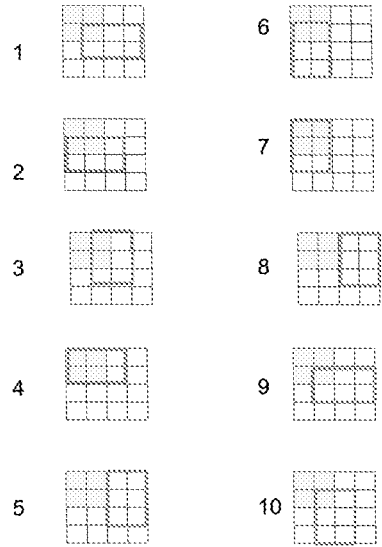
(d)
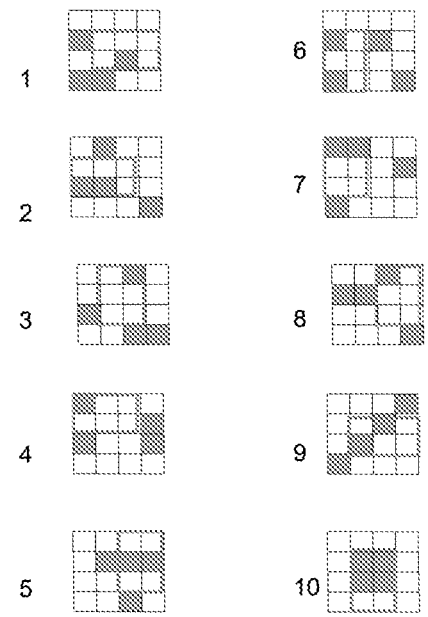

Fig-1b Entropic Reading Illustration [parts (e),(f)]
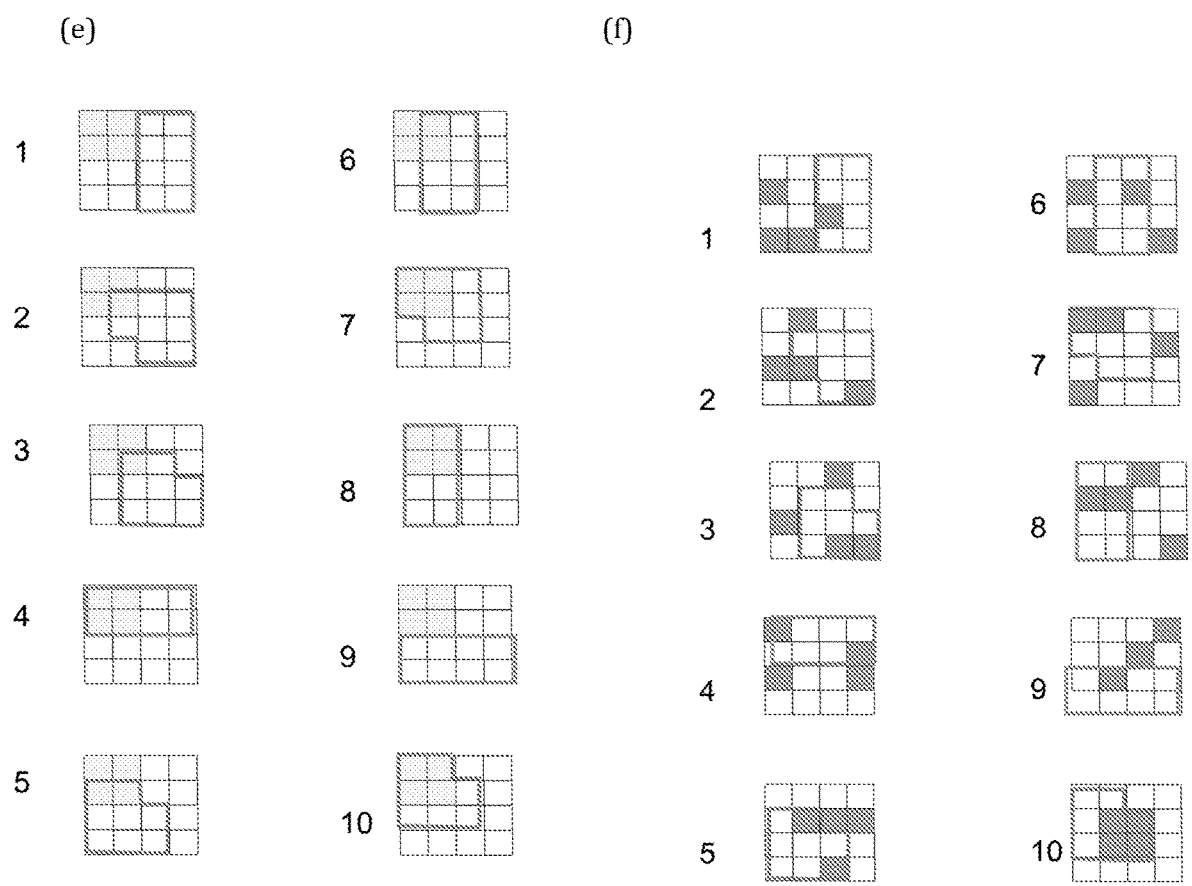

Entropic Mixing Apparatus multi ingredient entropic mixture

Cascaded Entropic Mixing Apparatuus

Entropic Mixing Stages

Entropic Ratio Disc Set

Slicing Round of a three ingredients entropic mixing

Entropic Ratio Discs

Entropic Marking with Tracers

Variable Aperture Entropic Disc

Entropic Message in Inherent

Entropic Message Readable
on a tall flag on a windy day

Entropic Reader Monitors Dispensing of Pills

Preventing Friendly Fire with
Entropically Marked Uniform

Entropic Writer

Entropically Marked Rolling balls

Entropic Mixing Apparatus (EMA)

Writing an Entropic Word

Live Entropic Traffic Report

Entropia CCTV

Entropic Air-Traffic Control

Significance Orientation Entropic Message

Fig-23
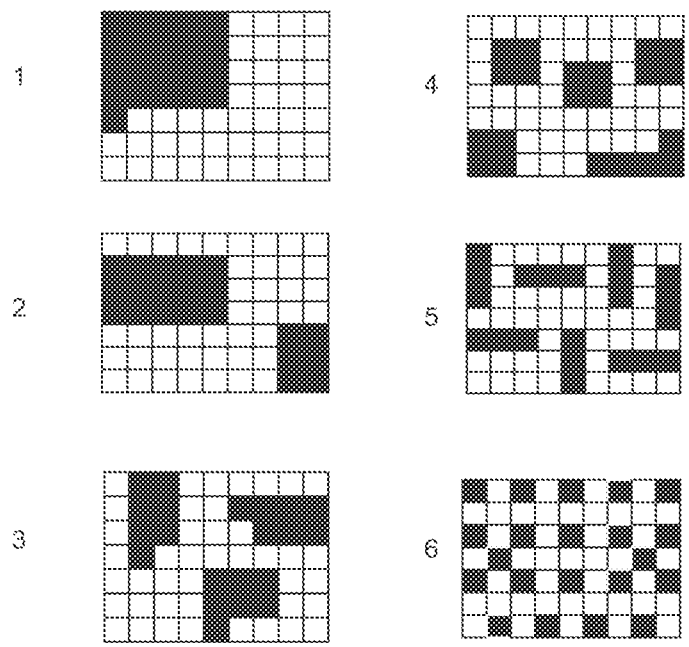
Uniformly Adjusting in Screen Writing
Entropic Mixture of Smooth-Rough Surfaces
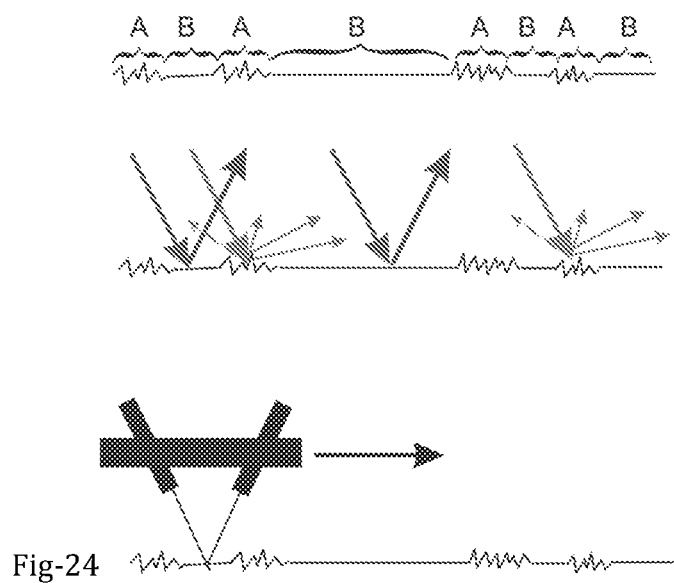
Fig-24

Fig-25
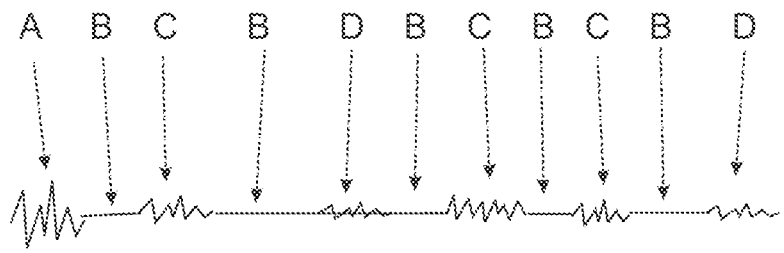
A Four smooth-rough Ingredients entropic mixture
Fig-26
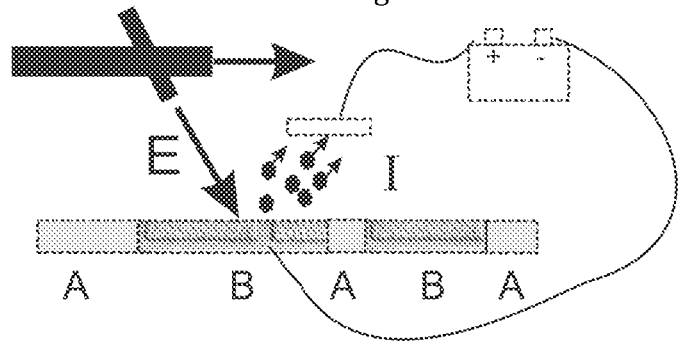
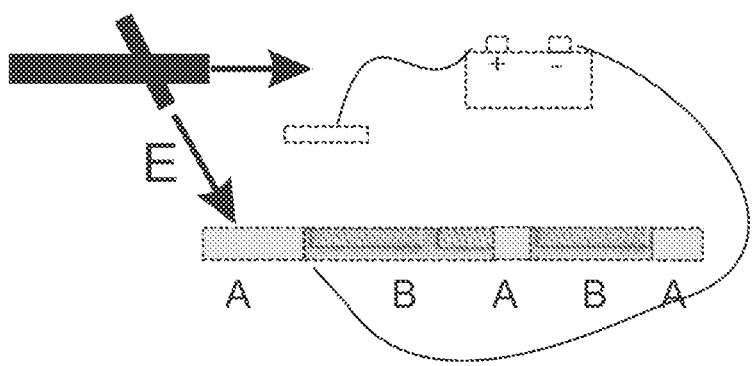
Photoelectric Entropic Reading Fig.-27
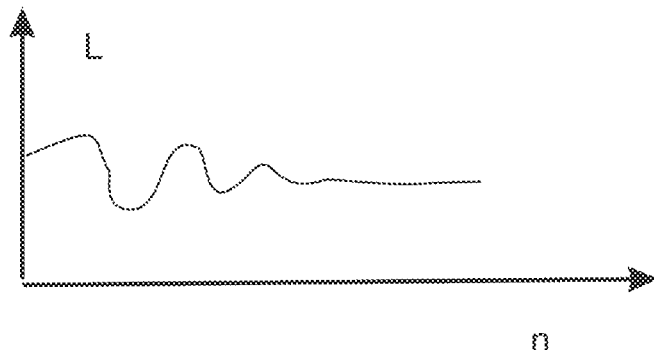
Asymptotic Reading of Entropic Letters
Fig-28
Superimposing Shape and Shapeless Alphabet
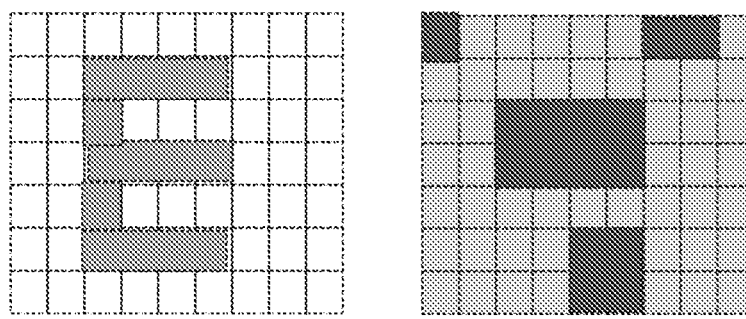
shape shapeless
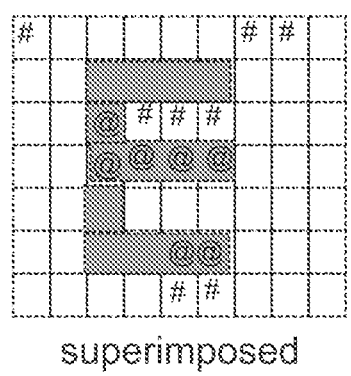
superimposed Dynamic Entropic Balloon Drone Spots a Lost Traveler Outdoors Entropic Communication Entropic Balloon Fig-33
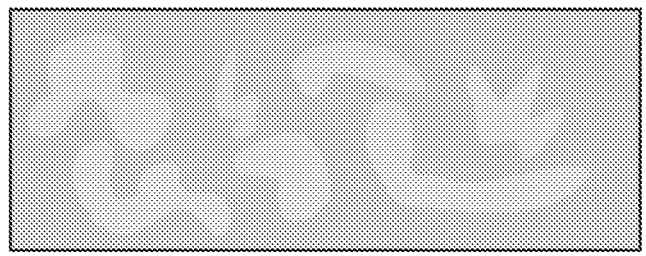 (a)
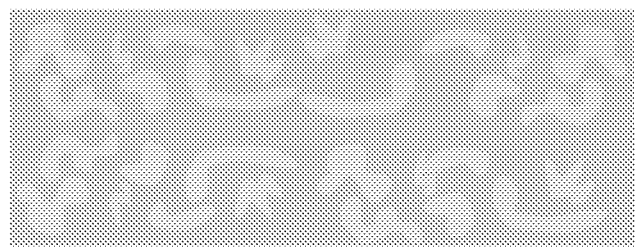 (b)
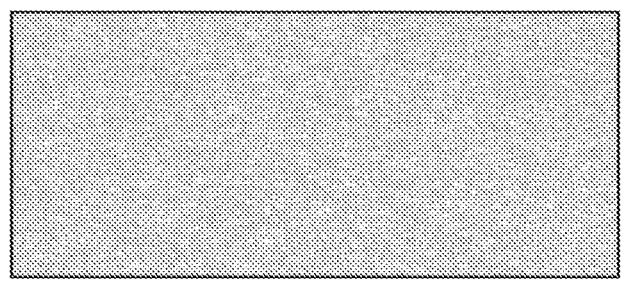 (c)
Artistic Entropic Spray Options Randomized Stain Generation (a)

(b)

Symmetrical Transformation

Fig-36
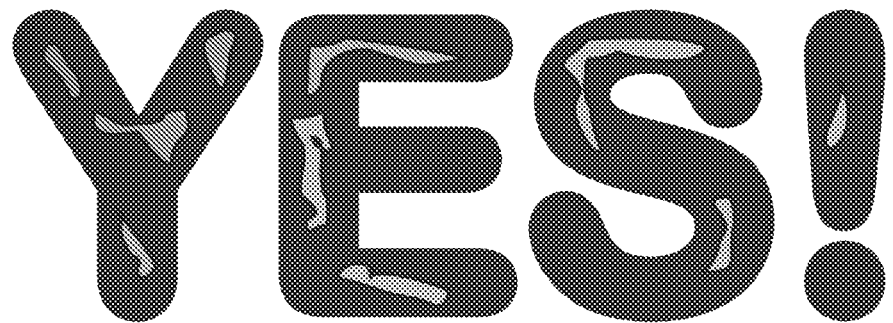
Signed Displayed Message
Fig-37
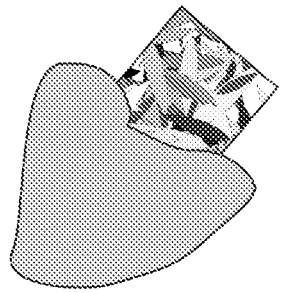
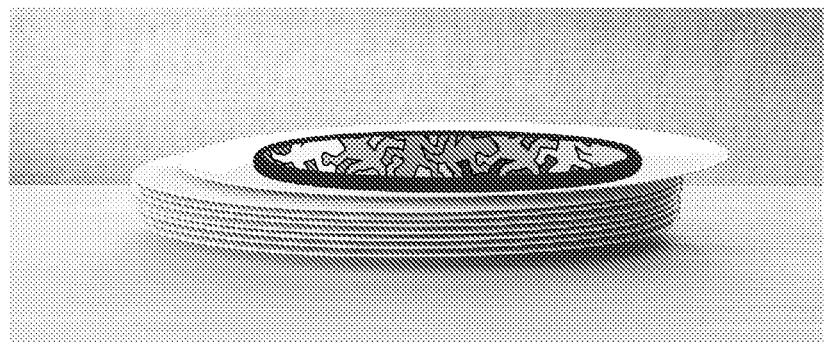
Entropically Presented Food Symmetric Distancing Directional Entropic Network Entropic Tube Painter

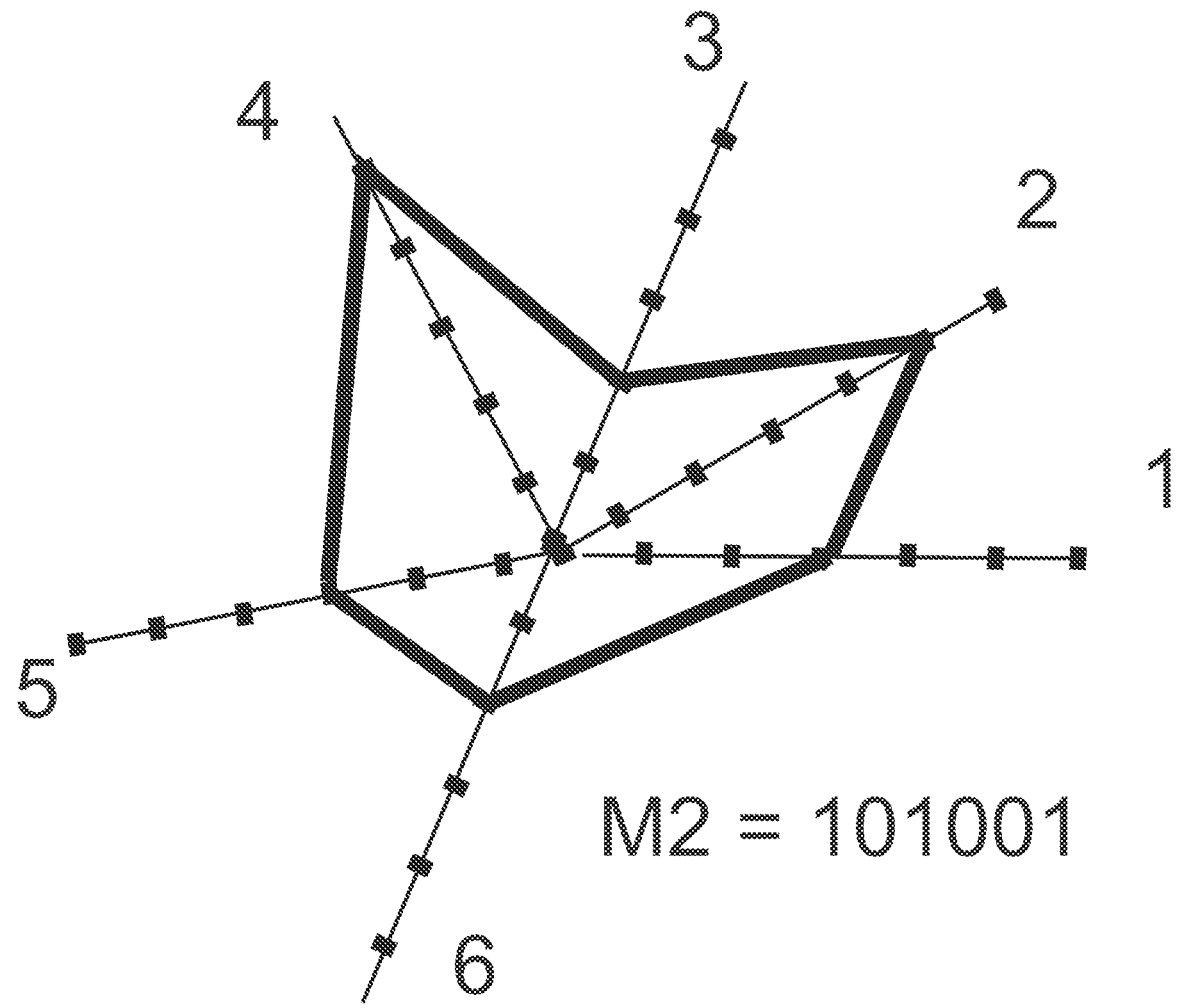

APPLICATIONS OF THE SHAPELESS (ENTROPIC) ALPHABET

BRIEF SUMMARY OF THE INVENTION

The "shapeless" letter (also known as the entropic letter) can be accurately read from any direction over a folded or curved surface where some parts are covered, allowing for robust communications. Applications include packaging, shipping, handling, industrial control, emergency rescue, message validation, wall painting, coloring of clothes, presentation of food dishes, and various video technology applications.

CROSS REFERENCE TO RELATED APPLICATIONS

Provisional Application No. 63/051,652 filed on Jul. 14, 2020; Provisional Application No. 63/034,401 filed on Jun. 4, 2020; Provisional Application No. 63/005,062 filed on Apr. 3, 2020; Provisional Application #62/963,855 filed on Jan. 21, 2020; Provisional Application No. 62/931,807 filed on Nov. 7, 2019; Provisional Application No. 62/926,560 filed on Oct. 27, 2019; Provisional Application No. 62/900,567 filed on Sep. 15, 2019.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

Shapeless alphabet is comprised of letters which are not judged by their shape, rather by their relative size and proximity to other letters. This disengagement from specific shape and geometry makes Shapeless alphabet more readable, and this opens door to a variety of applications where readability and impression of a message are of great importance. The human eye distinguishes between uniform and less uniform mixtures, and a camera will do so very well. Historically, new languages opened doors to important new developments; one may expect a similar outcome here.

The entropic language is based on a shapeless alphabet where the geometry of the letters plays no role; their size and proximity does. The appearance of an entropic (Shapeless) message has artistic impact, and can be applied in various setups to attract human attention, raise interest and investigation. Entropic language is useful for any communication, especially for cases where the geometry between the entropic script and the entropic reader is non-accommodating. Entropic messages may be directly visualized and come across as an alternative to Internet connectivity. This invention lists several application with an artistic impact: surface painting, food preparation; it lists communication applications: for rescue and emergency, for urban communication, for cryptographic uses.

BRIEF EXPLANATION OF DRAWINGS

FIG. 1 Entropic Reading Illustration The figures shows a board constructed from 4×4=16 squares which are marked as either ingredient A (shaded squares) or ingredient B, (unshaded squares). Two entropic modes are shown: (i) the A squares come in chunks of 4 contingent squares, (ii) the A squares come in individual squares. The board is analyzed through 10 randomized slicing. Each slice is analyzed per its A v. B contents, and the results are computed in the section "illustration" in the specifications. Three sizes of slices are used: 4, 6, and 8 squares. In each of the slice sizes, the result show that the entropy (the uniformity) is higher in the case where ingredient A is distributed per individual squares, as expected.

FIG. 6 Entropic Ratio Disc Set This figure shows flat view of the two discs marked "S" and "R" shown in future 5, only that in this figure the discs are set to admit 6 ingredients to be co-mixed entropically. The figure shows disc S with 6 holes of varying sizes. Each hole will be fed by a supply line of one ingredient. Disc R rotates abreast of disc S. Every time the disk R opening overlaps over a given opening in disc S the ingredient that flows through this hole is admitted to the next entropic chamber. The faster R rotates the less ingredient material is admitted. The larger the hole for the ingredient, the more of the ingredient is admitted. The greater the pressure that the ingredient is under, the more ingredient material is pushed through.

FIG. 23 Uniformity Adjusting in Screen Writing This figure shows a message area M comprised of 7×9=63 pixels. M shows two ingredients A and B depicted as black color for A and white color for B. Six examples are shown. In all of them the ratio $R_m = |A|/|B| = 21/42 = 0.5$. In the first example the uniformity is minimal as all the 21 A pixels are put in one single block. In the second case A is divided to two block, higher uniformity . . . and so on until example 6 where the uniformity is maximized.

FIG. 24: Entropic Mixture of Smooth-Rough Surfaces
The top of the figure shows a surface comprised of smooth and rough areas, marked as A and B. The middle part of the drawing shows the difference between the response of a smooth area of the surface and a rough area thereto. When light (laser or otherwise) is shined on a smooth surface, the light beam is reflected symmetrically, but when the same beam is directed at a rough area, then the light is scattered. The bottom part of the figure shows an entropic reader comprised of a radiating element that sends a light beam to the inspected surface at a prescribed angle, and comprised of a light detector positioned so that it would read the light beam reflected symmetrically from a smooth area of the surface. If light is detected above a certain threshold then the shined spot is determined to be smooth. Otherwise it is regarded as rough. The contraption glides over the surface to take a good measurement of the entropic mixture. Alternatively the surface can be made to roll past the detector apparatus. The apparatus is engineered to cover sufficiently large area of the inspected surface.

FIG. 25 A Four Smooth-Rough Ingredients Entropic Mixture
This figure shows a surface comprised of smooth area and three grades of roughness.

FIG. 26 Photoelectric Entropic Reading The figure shows an electromagnetic radiation E projected onto an inspected surface. The surface is comprised of two material ingredients A and B. A is material with electrons bonded to their nucleolus so tight that the incoming radiation does not release them. Material B, on the other hand, is a material where the electrons are sufficiently loosely bonded to their nucleus, such that when the radiation E 'attackes' them, some electrons get loose. As they become 'free' they are pulled up by a positive electrode (shown). The resultant current is measured and confirms the identity of the surface material. The whole contraption glides across the inspected surface in order to perform an accurate reading of its entropic mixture.

FIG. 27 Asymptotic Reading of Entropic Letters This graph shows the application of the differential method for entropic reading. The entropic reader reads slices in the mixture, M, and applies the procedure to compute the entropic message—the entropic letter—on M. When new slices are added to the measured slices list the computed value changes. The figure shows how the value of the letter L oscillate and changes when a new slice is added to a short list of measured slices, but eventually when the number of slices grows and grows, the value of computed letter L is converging to the asymptotic read of the entropic letter L associated with surface M.

FIG. 28 Superimposing Shape and Shapeless Alphabet
The figure shows first a shape-based message, the letter "E" expressed in pixels on a screen. This is done by using a light background as the "page" and a dark coloring to draw the letter, "E", the "ink". Second it depicts a shapeless message expressed on the same size screen, expressed through dark and light colors. The idea of the superimposition is that the light background in the shape-based screen is marked with two shades of light color: $L_1$, and $L_2$. The human eye intended to read the shape based message will not distinguish between these two shades, but a sensitive camera will. Also the dark color in the shape-based message will be depicted with two shades of dark: $D_1$, and $D_2$. Again, the human eye does not distinguish between the shades but a camera does. In the superimposed part of the figure every light pixel in the shape-based screen will be written as $L_1$ shade, except for background pixels that are marked 'dark' in the shapeless screen. These particular pixels will be marked $L_2$. In the figure $L_2$ pixels are represented as "#". Also, in the superimposed screen, the "ink" will be marked as dark shade $D_1$, except for pixels that correspond to the dark shade on the shapeless screen. The latter will be marked with shade $D_2$. On the figure the $D_2$ pixels are marked with '@'. This arrangement allows a human reader (or a corresponding camera) to read the letter "E" on the screen. All the while, the same, or different camera will distinguish between $L_1$ and $L_2$ shades, and between $D_1$ and $D_2$ shades. The latter camera will then count all the pixels that are marked either $L_1$ or $D_1$ as one shapeless color, and all the pixels that are marked $L_2$ and $D_2$, as the opposite shapeless color. All in all the superimposed screen will convey both a shape-based message and a shapeless message.

FIG. 33 Artistic Entropic Spray options
This figure shows three distinct levels of entropy. The lowest level (c) the highest level (a) and the in between level (b). Different people react differently to different entropic levels. Each looker has a level of entropy that is most relaxing and most attractive to them. So users can choose the level of entropy they prefer when it comes to artistic uses. Such are wall painting, food lay out, decorative pages on a brochure, markings on items of clothing etc. Each surface is unique. If the source of the entropic display is sufficiently random then there will be no two surfaces that are an exact copy one of the other. Another pleasing thought, The idea behind the artistic attraction of the entropic surface is that people in general are pleased by a display that has a framework of order but is marked with a randomized surprising add on. This is the secret of attractive music and attractive painting: a kept basic order, superimposed with a surprising novelty. The entropic message shows order: same ratio of the two elements, and a consistent degree of mixture (degree of entropy), yet the shapes themselves are different from display to display. This is an advanced notion of the familiar diffused colors that are so common in publications and displayed colorful surfaces.

This figure shows how to generate an electronic stain to fit into an entropic display. The generating software has a surface interval of area $A_{min}$ to $A_{max}$. Using a randomness source the software randomly picks an area A: $A_{min} \leq A \leq A_{max}$. Next the software uses a set of spokes: $s_1$, $s_2$, ... $s_r$, coming from the same center, and randomly chooses a distance $d_i$ for each spoke $s_i$ fo i=1, 2, ... r. The software then computes the area captured between the r lines that connect the distance markings on the r spokes. This is are $A_1$. If $A_1 < A_{min}$ then the software increases the distance markings on the r spokes: $d'_1$, $d'_2$ ... $d'_r$, and recalculates the area captured within the new connecting bars between the new distance markings. As long as the calculated area is smaller than $A_{min}$ this new markings repeats. It stops when the calculates area A inside the interval $A_{min}$ to $A_{max}$. If the original are A is larger then $A_{max}$ then the software randomly reduced the distance marking on the spokes. By controlling the value of r, the software will control how smooth the stain will be. The random markings on the spokes will insure the randomized shape of the stain.

Figure 35:
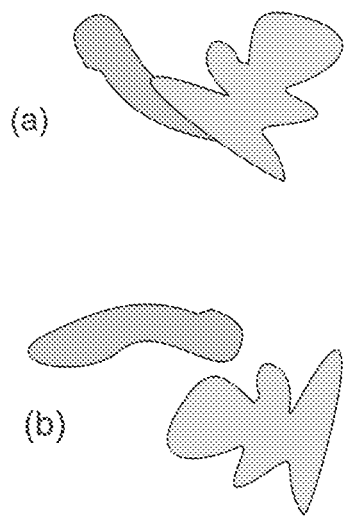

FIG. 35: Symmetrical Transformation

This figure shows how two entropic stains marked on a surface with an overlap (a) may be shifted symmetrically either rotation or mirror flipping or a combination such that they don't overlap.

FIG. 36: Signed Displayed Message

This figure shows a printed message "YES" which is also marked with an entropic message. The entropic markings are visible to the camera, but are not very visible to the naked eye. The human reader sees the shapeful (geometric) message, in this case "YES". But the camera distinguishes between shades of grey, in this picture, and reads the associated entropic message that comes with the plain message, "YES". This entropic message represents the hash of the shapeful message, after the hash has been encrypted by the author of the statement, using the author's private key. When the camera reads the entropic message it then decrypts it using the public key of the author of the plain message "YES". The decrypted message is compared to the hash of the plain message as it is being processed by the reader of the plain message. If the comparison shows a fit, then the reader of the plain (geometric, shapeful) message is assured that the plain message was written by the declared author. This operation is automatic. A person sees as street sign quoting a politician, say. He directs his camera at the sign, and immediately gets a confirmation that the author of the statement on the sign is the one is said to have said it. When dead people are quoted then the plain statement may be signed by a credible institute that causes readers to believe the authenticity of the statement. The same happens for brochures, and pamphlets. The skeptical reader will point his phone camera and get a confirmation of authorship.

FIG. 37: Entropically presented food

This figure shows on the upper side a wrapped snack which is comprised of entropically assembled meat, greens, tomato and bread, say. The size of the 'stains' of the ingredients have been optimized per the preferences of the majority of the consumers of the snack. The lower part shows a dish entropically combining meat, greens, and pasta per optimized proportions.

Figure 38:
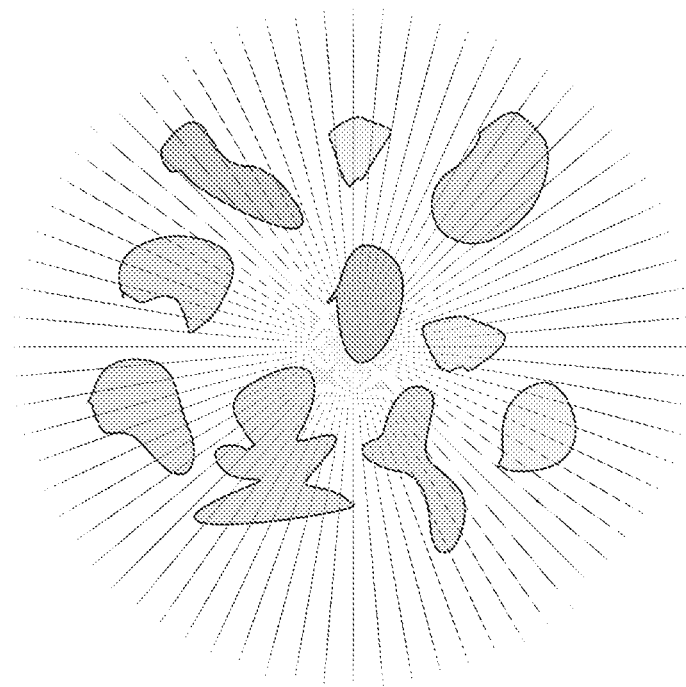

FIG. 38: Symmetric Distancing

This figure depicts the dynamics of marking an entropic message by first overlapping a bunch of stains, randomly prepared, then taking each stain on a different azimuth, so that all the stain create a growing set of distances one from the other. When the distances are large enough that the no two stains overlap the separation may terminate, resulting in the desired entropic message.

Figure 39:
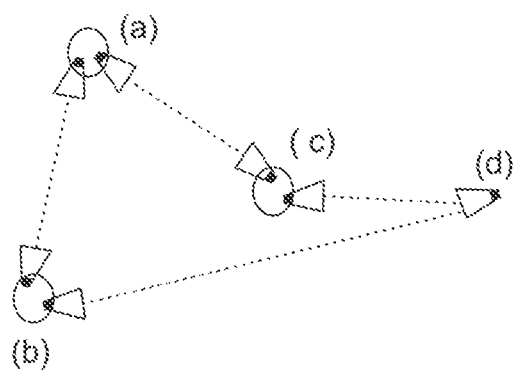

FIG. 39: directional entropic network

This figure shows how a set of field communicators use a directional setting so that the entropic surface can be seen only from a narrow direction. Communicator (a) may exchange messages with (c) and (b); communicator (c) talks to (a) and (d), and communicator (b) talks to (a) and (d). Eavesdropper outside the prescribed azimuths will see nothing.

Figure 40:
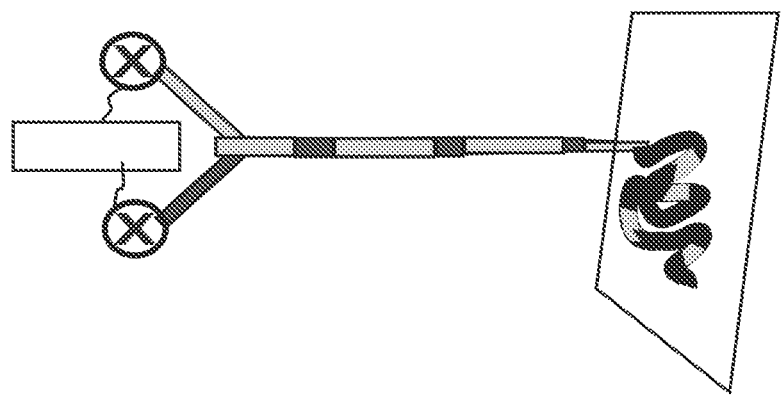

FIG. 40: Entropic Tube Painter

This figure shows an entropic painter where a painting tube is fed from two sources, (two colors), one light grey and one dark grey. The feeds are coordinated, so that each feed operates when the other is shut and the time of operation is randomized around a given value. This results in 'piston' movements of the two colors within the painting tube. The painting tube then runs around the painted surface in a randomized fashion until is paints the entire surface.

FIG. 41 Entropic Subliminal Message

Figure 2:
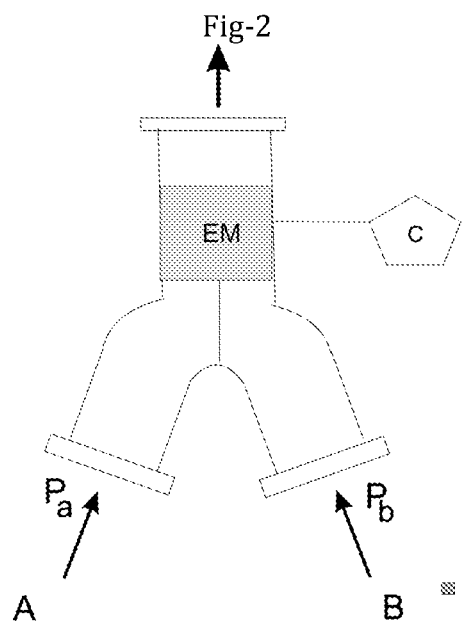
FIG. 2 Entropic Mixing Apparatus This figure shows a basic bilateral apparatus. Two ingredients A and B are pushed from below, each with its own pressure $P_a$ and $P_b$ respectively. The two ingredients are fed into the entropic mixer, EM where they are mixed in a desired state of entropy and pumped on from there. The EM is controlled by an electronic controller, C.
Figure 3:
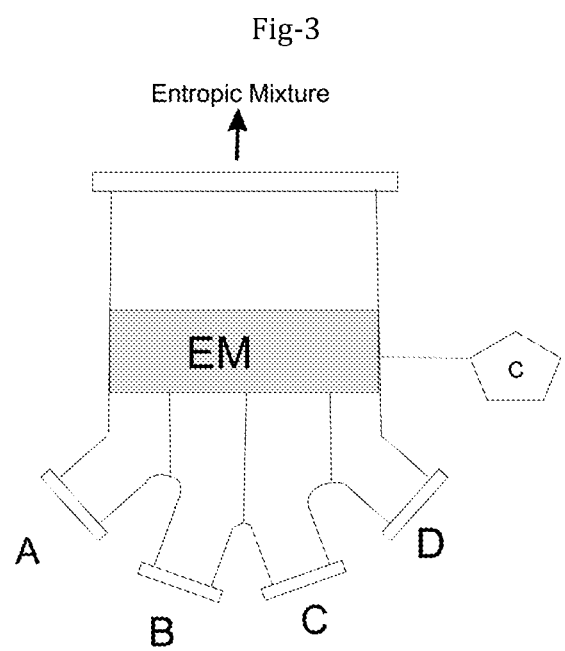
FIG. 3 Multi Ingredient Entropic Mixer This figure shows an entropic mixer taking in 4 ingredients A, B, C, and D. The ingredients are fed into the EM, which arranges them in the desired entropic state. Similarly there may be any number of ingredients entropically mixed.
Figure 4:
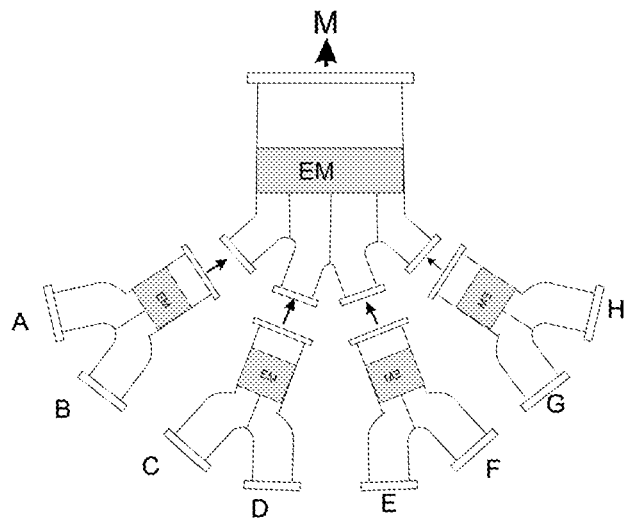
FIG. 4: Cascaded Entropic Mixing Apparatus This figure show a 4 ingredient mixing apparatus fed with the output of four bilateral entropic mixtures, so that all in all 8 ingredients build up the entropic state (A, B, C, D, E, F, G, H). This configuration maintains the bilateral entropic message between the ingredients in the bilateral mixers, namely A v. B, C. v. D. E v. F and G v. H.
Figure 5:
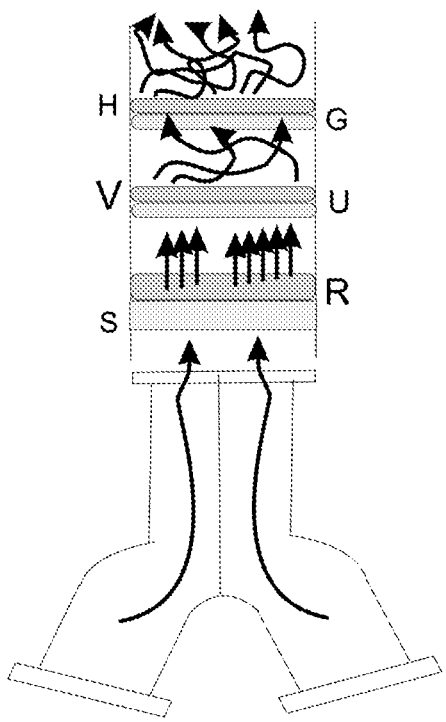
FIG. 5: Entropic Mixing Stages This figure shows how two ingredients are fed into an entropic mixing apparatus. They first encounter a stationary disk "S" fitted with holes of desired size through which the two ingredients flow further as the upper disc, "R" rotates at a desired speed, and every round it 'chops' a chunk of both ingredients, sending them to the next stage—the mixing stage where two discs, "U" and "V" are rotating in counter directions and each at desired speed, so that they create a moving location for the opening through which the mixture is moving to the next stage where again two discs "G" and "H" also rotate in counter directions, similarly create a moving location for the flow emergence forward. Such sets of two rotating discs may be added at will. Eventually the mixture emerges from the contraption with a desired entropic state.
Figure 6:
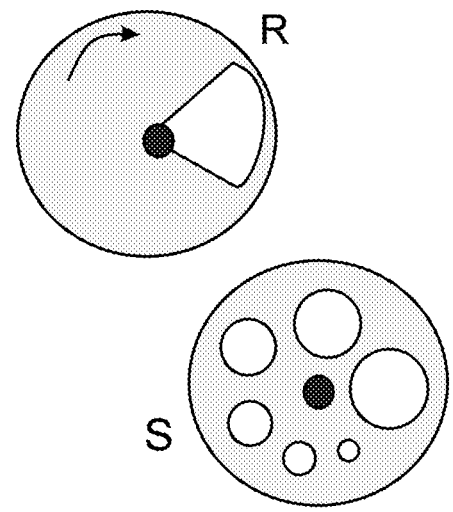
Figure 7:
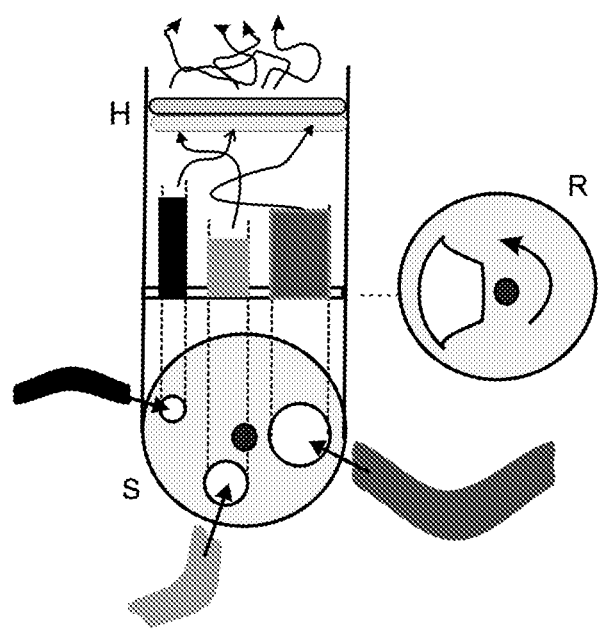
FIG. 7 Slicing Round of a Three Ingredients Entropic Mixing This figure shows a stationary entropic ring with three different size holes. Each hole is shown to be the terminal point of a feeding line of an ingredient destined for entropic mixing. (Shown in blue, pink, and black). The figure shows above the disc a graphics of the column of material of each ingredient that is cooped up in one round of disc R that rotates abreast of disc S. The ingredient with the larger hole, is pumped in in a greater amount. The exact amount pumped for the mixing also depends on the pressure that moves each ingredient and the respective viscosity thereto. Disc R is shown in the Sid. The figure shows how the 'sliced columns' of ingredients are pushed to the mixing set of disc, which like in FIG. 5 is comprised of two moving discs rotating counter each other, creating a moving spot for the flow forward.
Figure 8:
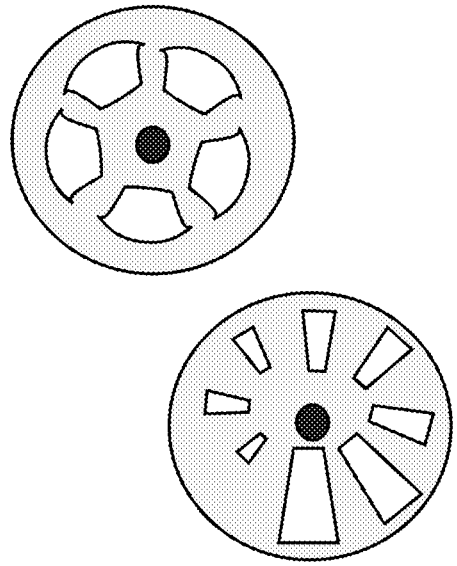
FIG. 8 Entropic Ratio Discs This figure shows two types of stationary discs in an entropic mixture setup. The top one admits up to 5 ingredients, each admitted through the same size opening. The bottom disc is fitted with 8 holes of different aperture size each, admitting up to 8 ingredients to be entropically mixed.
Figure 9:
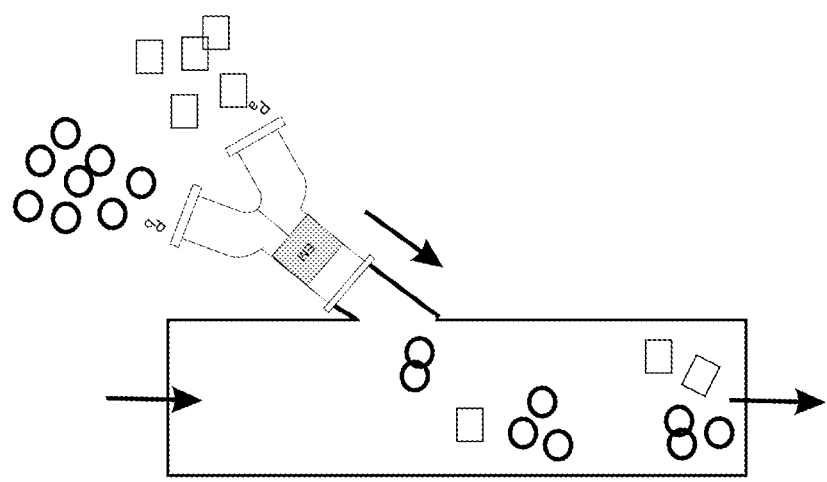
FIG. 9: Entropic Marking with Tracers This figure shows two entropic ingredients symbolized by squares and circles, as they are fed into an entropic mixer which in turn injects the mix into a carrier fluid.
Figure 10:
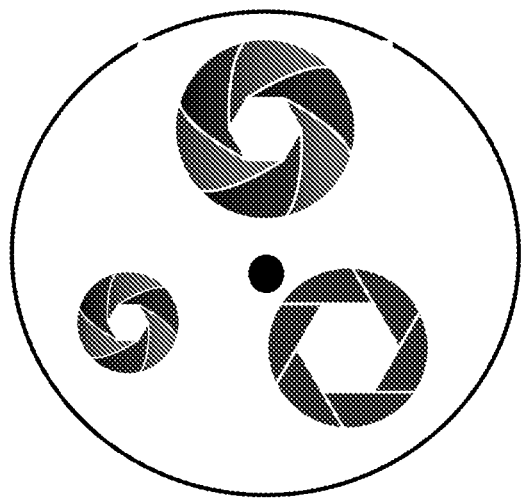
FIG. 10 Variable Aperture Entropic Disc This figure shows a stationary entropic disc fitted with three inlet holes, where each inlet hole is built as a variable aperture contraption so that the entropic mixer controller can set the size of the hole for each mixing batch.
Figure 11:
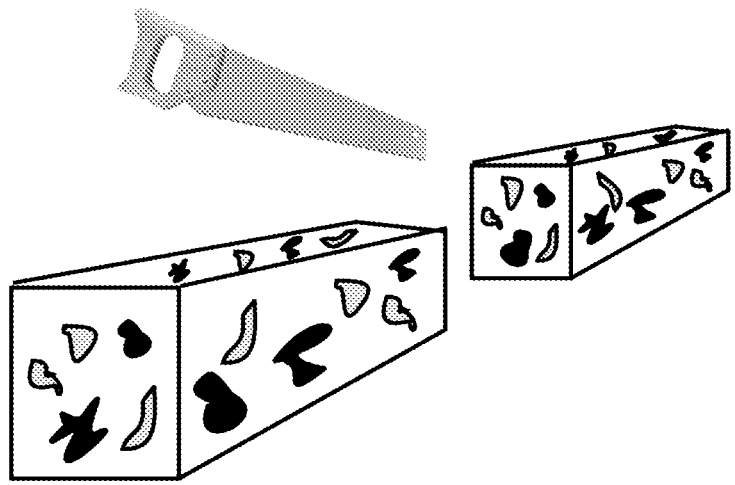
FIG. 11 Entropic Message is Inherent The figure shows a block of matter constructed with an entropic message, which is visible from any direction through any face of the block, and when the block is cut—the message is readable from the faces that were exposed in the cut.
Figure 12:
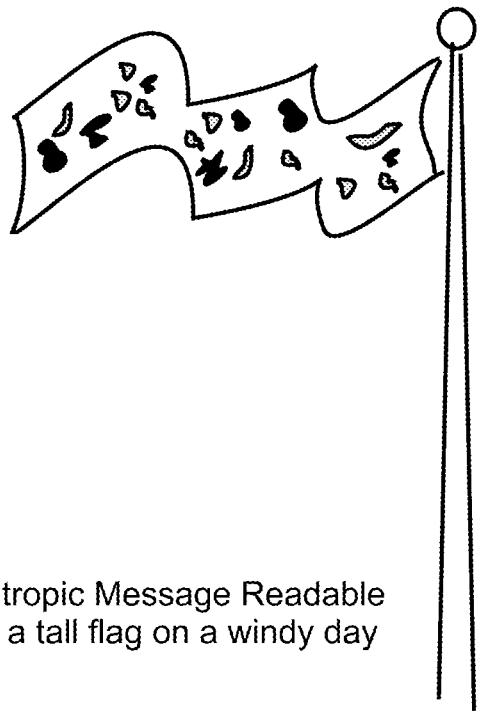
FIG. 12 Entropic Message Readable on a tall flag on a windy day The figure shows a flag flapping in a strong wind. Any shape-wise language on it will be hard to read, but an entropic message is easily readable. Important in cases of emergency.
Figure 13:
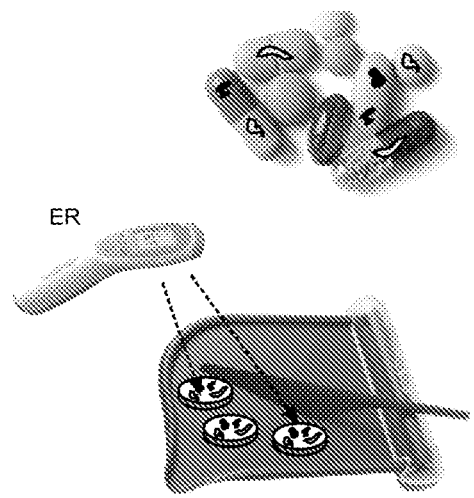
FIG. 13: Entropic Reader Monitors Dispensing of Pills The figure shows a pill dispensing tray with entropically marked pills which are monitored by a fixed entropic reader. The figures shows several sorts of pills entropically marked. Such marking can be used together with shape information to monitor handling of pills.
Figure 14:
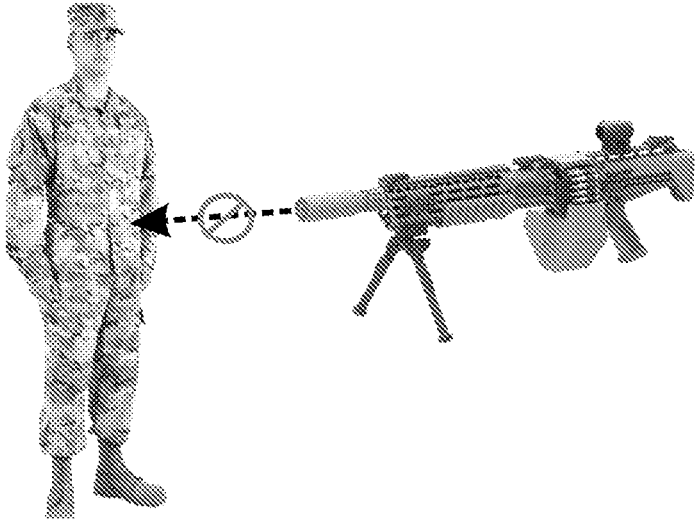
FIG. 14 Preventing Friendly fire with Entropically Marked uniform Friendly fire is a painful unresolved problem in the battlefield. Machinegun and rifles can be fitted with an entropic reader that will identify friendly uniform even is dusty and only partially exposed, and then either not shoot or alert the shooter. It is difficult to achieve this degree of field efficacy with shape based alphabet.
Figure 15:
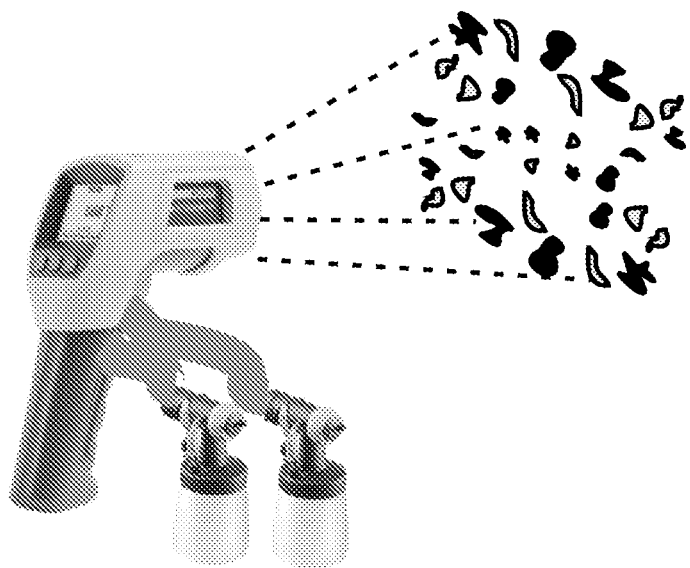
FIG. 15 Entropic Writer This figure depicts a hand-held entropic writer, fed from two containers with the mixed ingredients. It spray-paints an entropic layer on some surface, ready for an entropic reader to read.
Figure 16:
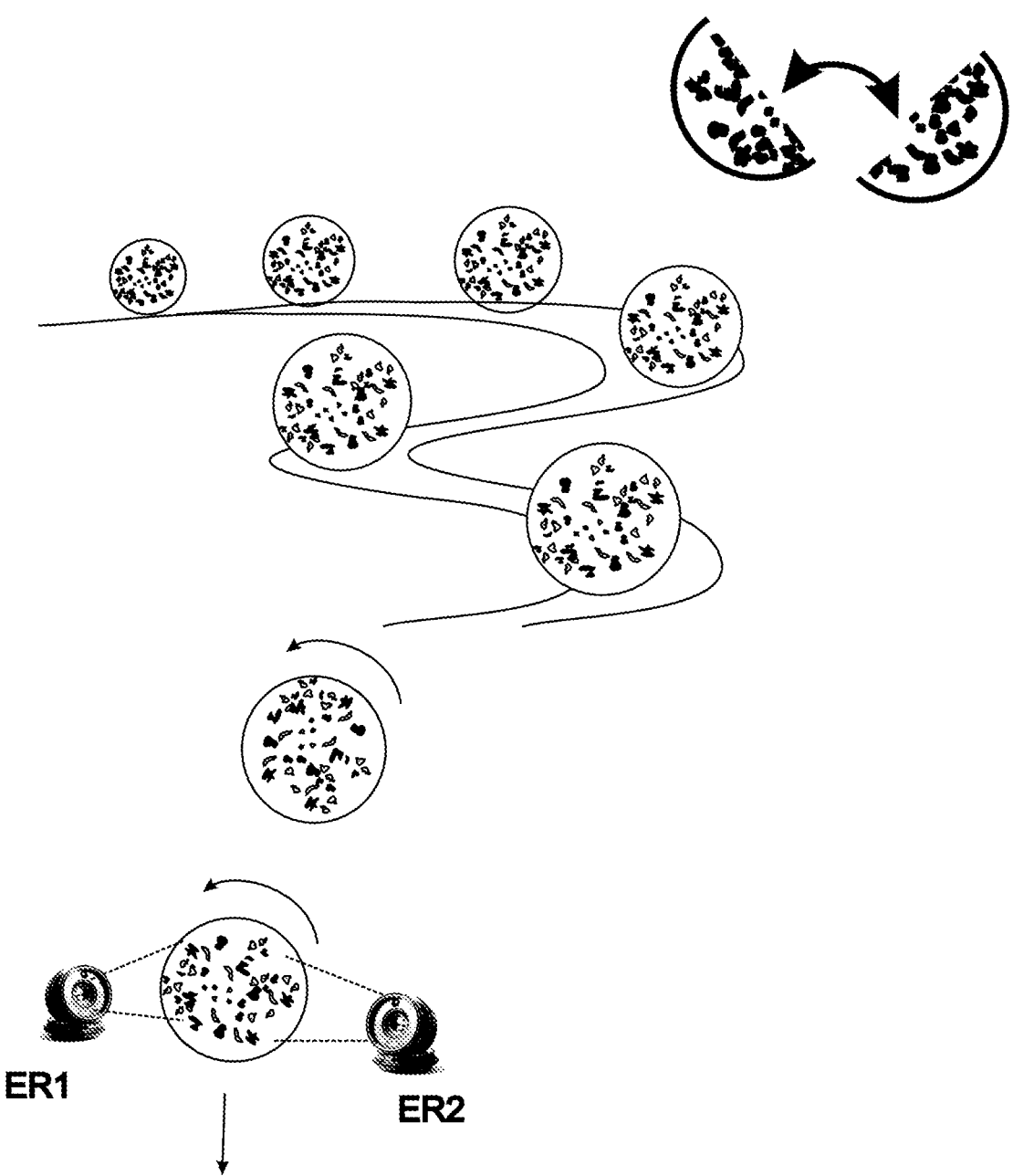
FIG. 16 Entropically Marked Rolling Balls The figure shows rails over which balls are rolling down the slope. When a ball drops from the rail to the next station of its processing, it is viewed by two entropic readers that keep track of which ball came through. The balls can be objects of interests or they may be handling enclosures housing some items of interest. The advantage of balls is that they roll freely on every minor slope and which is easier and cheaper to install than rolling conveyors needed for square boxes. Since the entropic message is readable from every direction, it makes no difference if the ball rotates. By contrast any shape based alphabet require particular orientation between the reader and the examined object.
Figure 17:
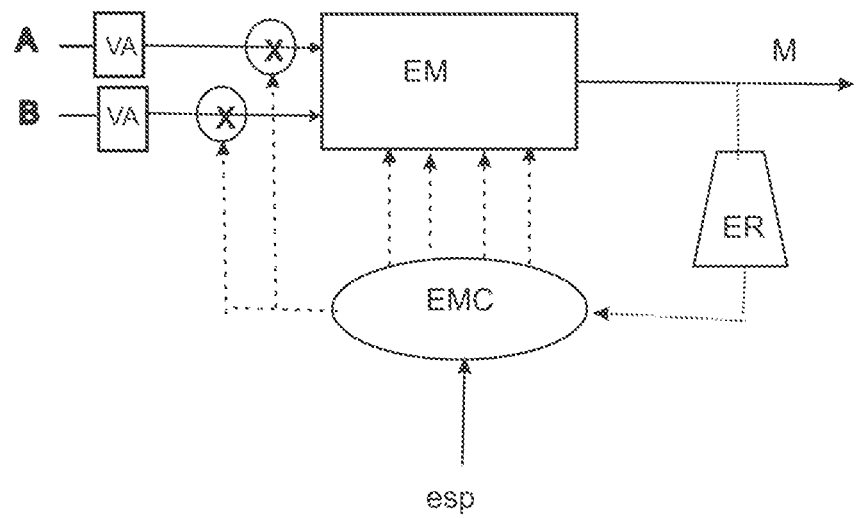
FIG. 17: Entropic Mixing Apparatus (EMA) configuration. This figure shows the configuration of the apparatus, EMA. The two mixed ingredients A and B are fed into the EM—the entropic mixer. The stream is controlled through valves, which in turn are controlled by the entropic mixer controller, EMC. The EMC also controls various operational parameters of the EM, as shown with four dotted lines. The mixture generated in the EM flows out, as shown in the solid arrow marked by "M" (mixture). As it comes out the mixture is examined by an entropic reader that is part of the EM apparatus. The mixture readings are routed back to the EM controller. The logic inside the controller adjusts the controlled parameters to bring the output closer to the desired entropic message it should carry. This desired message is inputted to the EMC through an outside line marked entropic set point (esp). Standard control algorithms are employed in the EMC to adjust the output until it fits the desired set point. The EMA also includes the option to inject divider material to the mix, to signal the boundaries where the mixture carries the desired message, and to indicate boundaries between individual messages (letters) which combine into words. The EMA may be equipped with a heater or a cooler as the case may be, to adjust the viscosities of ingredients A and B to the desired range. Heat generally lower viscosities, and cold temperature increases them. But there are exceptions. These heat exchangers may be fitted on the EM itself or as shown in the figure, be fitted on the intake lines for ingredients A and B. In the figure they are labeled VA—viscosity adjusters.
Figure 18:
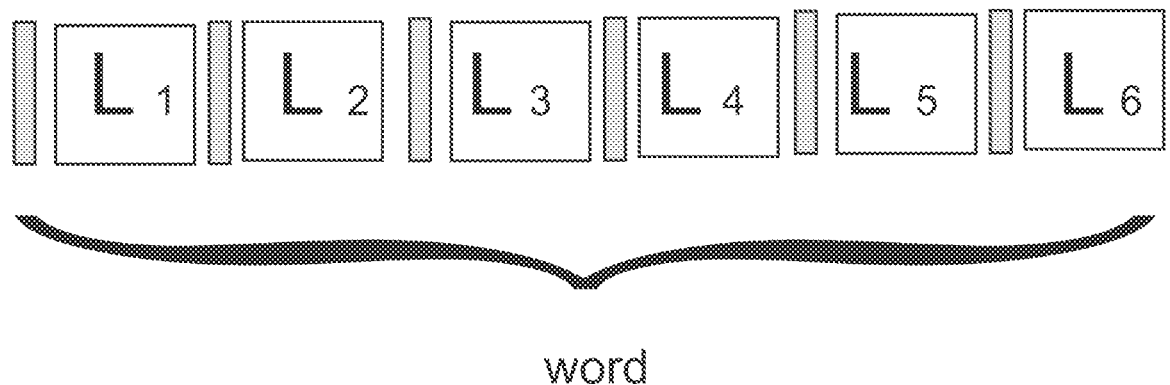
FIG. 18 Writing an Entropic Word The figure show a stretch of mixture of two ingredients A and B comprised of 6 letters separated by a divider material. The six letters combine to be a single word.
Figure 19:
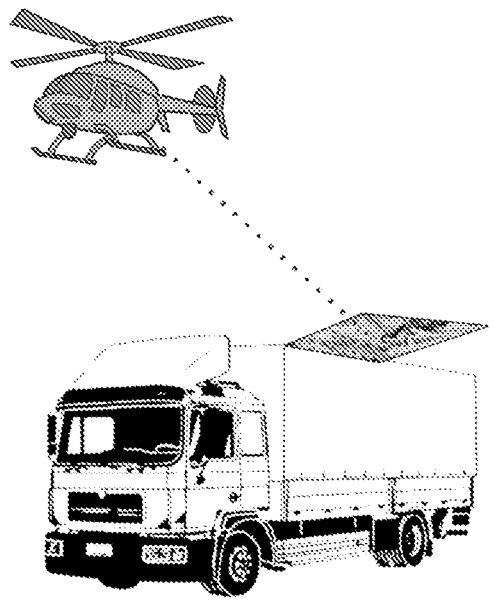
FIG. 19 Live Entropic Traffic Report The figure shows a truck fitted with a large screen on which the truck paints entropic message, which is picked up by over hovering chopper.
Figure 20:
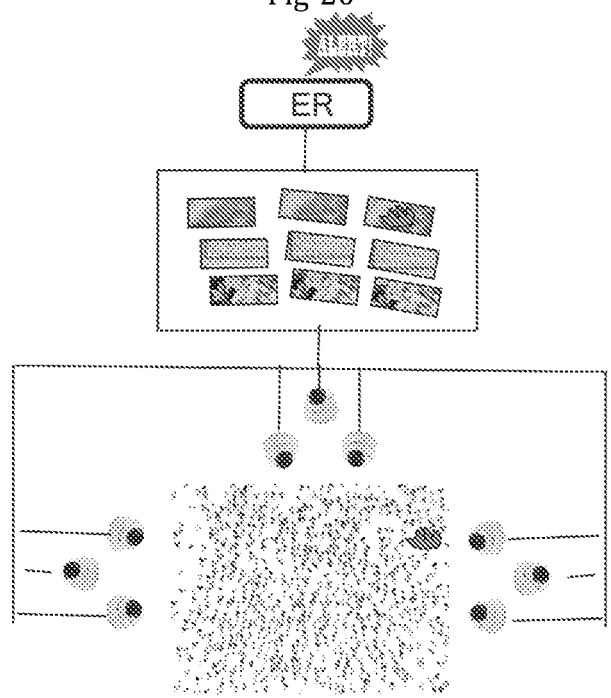
FIG. 20 Entropia CCTV This figure shows a large crowd being monitored by 9 CCTV cameras which feed into 9 screens. The screen are undergoing continuous entropic reading in order to spot unusual occurrence in the CCTV view range. The figure shows a fire erupting in one area of the crowd. The CCTV camera trained on that area projects the fire on its screen (see the red spots). The fire creates a very different entropic reading of the screen, and generates an alarm likely being fed to a human monitor. This is a better exploitation of scarce human attention. Instead of getting bored looking at nine repeating screen, the human examiner is directed to pay attention to the one camera where the entropic reading showed a big change.
Figure 21:
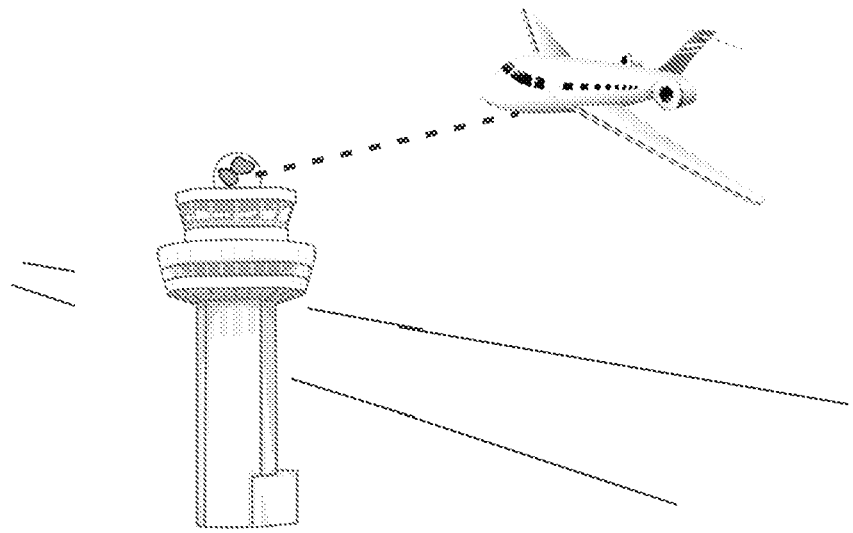
FIG. 21 Entropic Air-Traffic Control This figure shows an air traffic control tower with a projecting cup on which entropic guiding message is being displayed and is being read by approaching guided airplanes.
Figure 22:
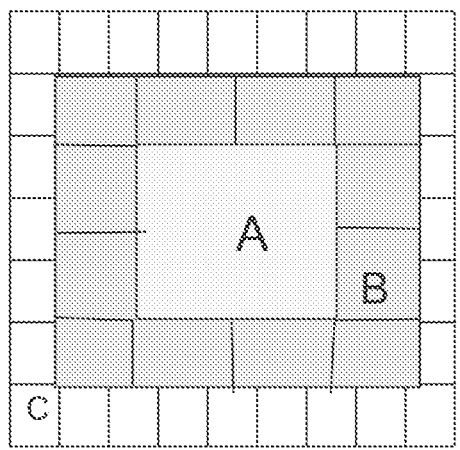
FIG. 22 Significance Orientation Entropic Message This figure shows an entropic canvass with three levels of messages divided by the area dedicated to each message. The most important message A is depicted on the largest area in order to minimize the chances for mis-reading it. The less important messages, class B are written on smaller area, and the C class, the least important, are written on the smallest area.
Figure 29:
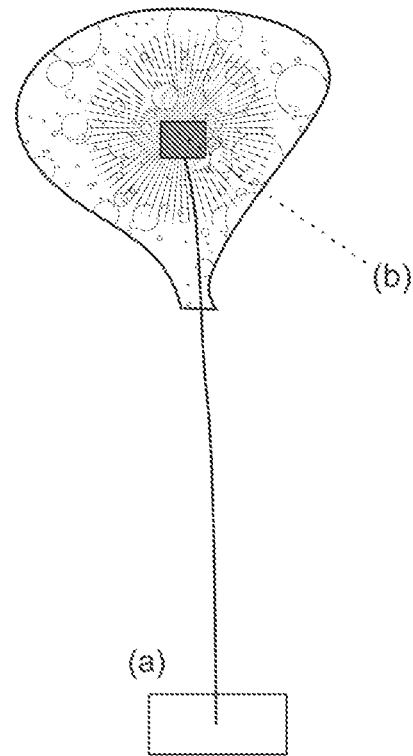
FIG. 29: Dynamic Entropic Balloon
This figure shows an entropic alert contraption used by a lost traveler or anyone in the open field wishing to use an entropic balloon to communicate to far away party. The contraption is fully open. At the bottom a rectangular (a) represents the human communication box where the user of the entropic alert types in his emergency message. This communication box has a keyboard and a screen. The user types in his or her message, sees it on the small screen, and then 'sends' it to be displayed on the balloon that is tethered to the communication box but is carried up in the air to increase its visibility for searchers and lookers. The balloon is raised because it is filled with a light gas. In the middle of the inflated balloon there is a light projector (b) that projects the entropic message sent to it via the tether and the communication box held by the user. The projector sends the light rays to the inner surface of the balloon. The surface of the balloon is made of transparent material so that the colors and the shapes projected on the balloon from inside, are then visible from the outside, from any direction. A more sophisticated contraption will have a camera at the bottom of the balloon so that is can read the entropic message delivered to it via a communication party.
Figure 30:
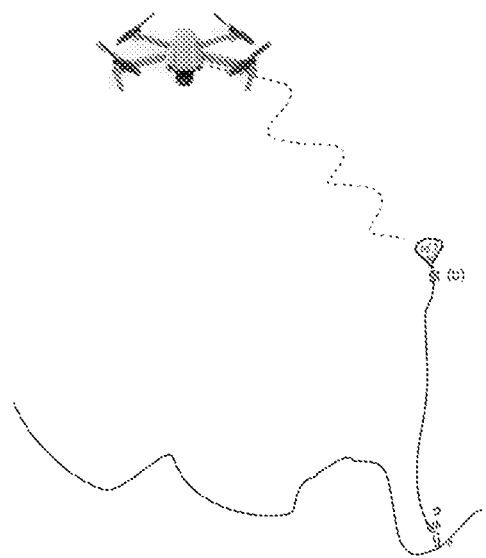
FIG. 30 Drone spots a lost traveler
This figure shows a lost traveler, raising an entropic bloom via a tether. The rising balloon is visible to a search drone that communicates back to the balloon. A small camera (b) captures the message sent to it from the bottom of the drone and then sends it in a readable fashion to the lost traveler who raised the balloon.
Figure 31:
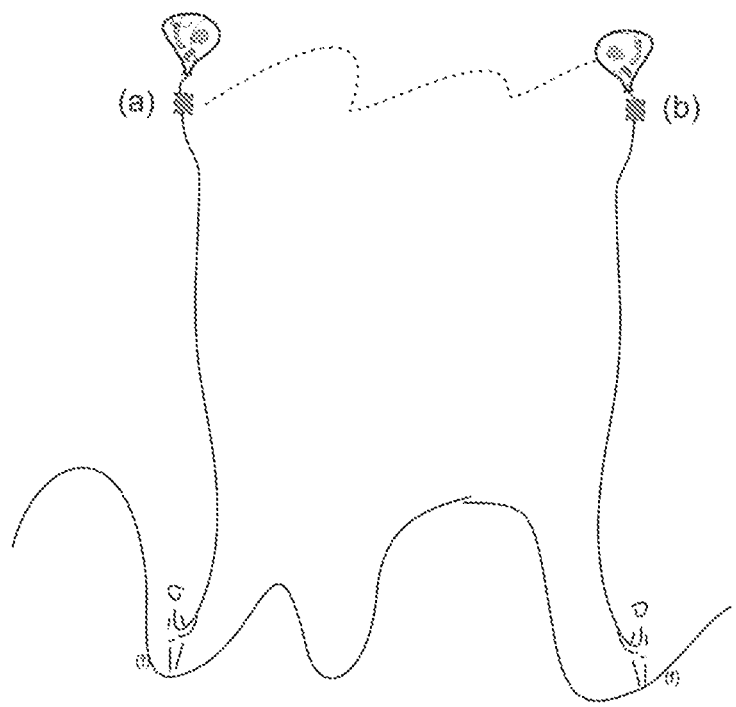
FIG. 31 Outdoor Entropic Communication
This figure shows too travelers who are out of sight in the wilderness and for some reason they don't have cell phone connection not Internet coverage. The two nonetheless communicate through raising each an entropic balloon. The camera attached to each balloon reads the message from the other balloon and passes that message to its user. The messages may be dynamic, recycled on the balloons.
Figure 32:
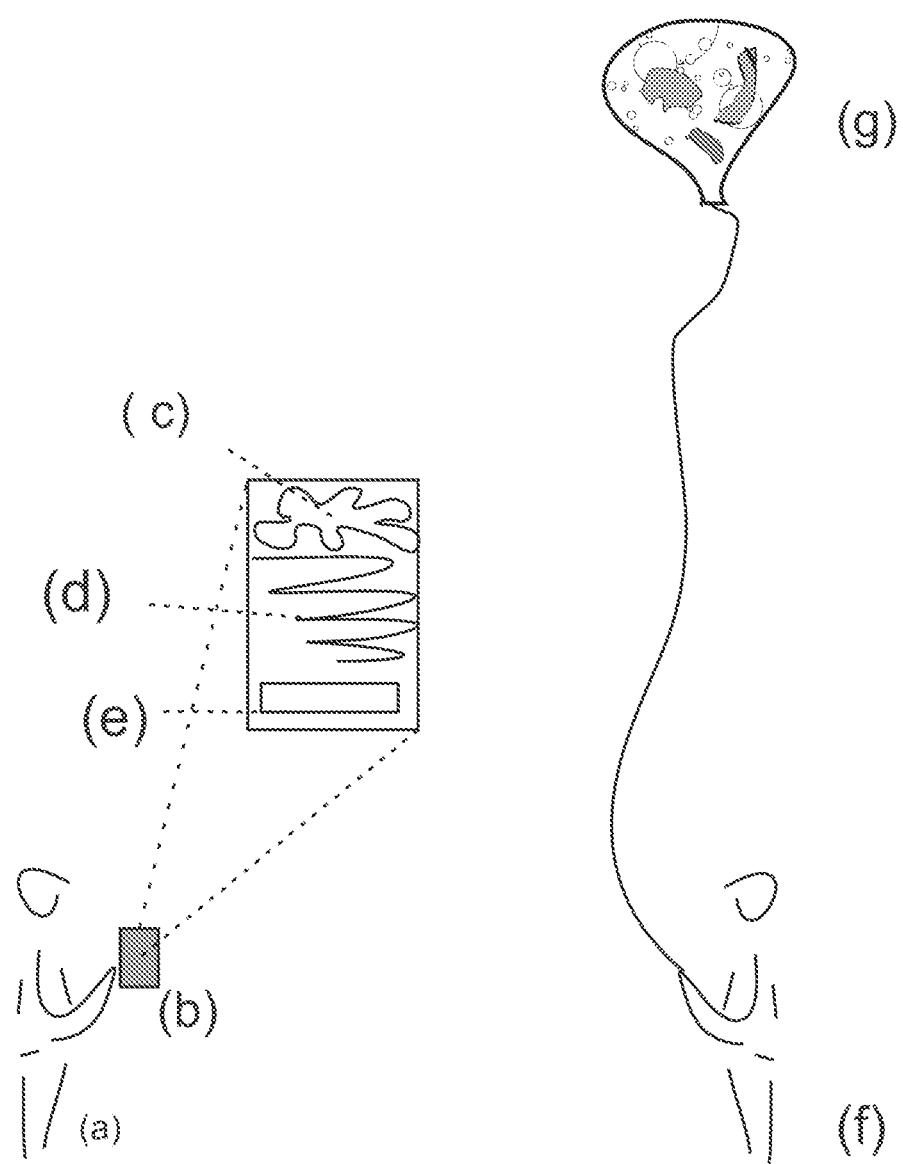
FIG. 32; Entropic Balloon
This figure shows on the left side an entropic balloon user (a). The user holds an entropic balloon contraption (b). This contraption is shown in details above the user. Inside we see (c) the balloon folded, (d) the folded rope, tether that would keep the balloon tried to the user. So if the user walks away to another location the entropic balloon follows it. The user could be sailing on the high seas or penetrate into a deep cave, and still alert their searchers to their location. The figure also shows (e) the compressed helium or other light gas that is activated to fill the balloon when it is being raised.
Figure 34:
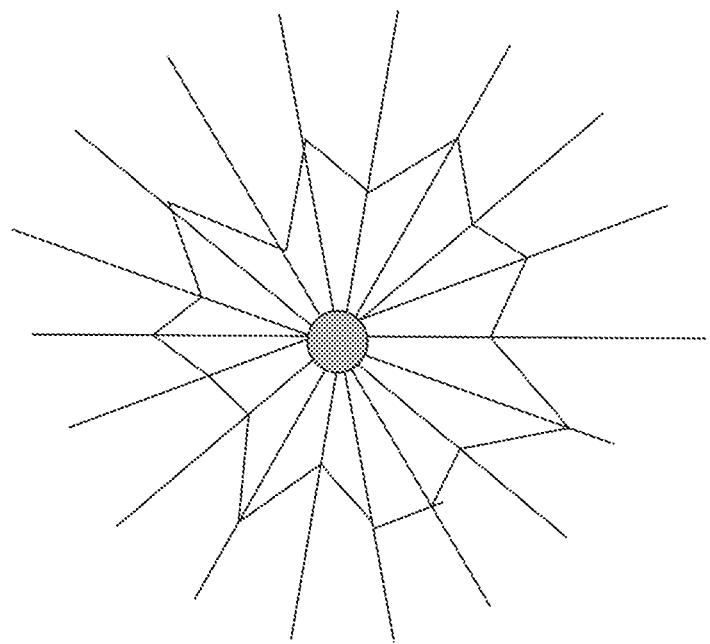
FIG. 34 Randomized Stain Generation

This figure illustrates how to write a subliminal message into drawing a stain as part of the entropic message. The stain is drawn through a framework of spokes. In this FIG. 6 spokes are identified. They are rigid, with specified center and specified angles between them. To draw the stain the user first select a point on the first spoke. The randomized selected point is 3 unit distance from the center, (say 3 cm). The painter then consults the bit string which is the subliminal message they wish to imprint on the stain. The message is the following bit string M2=101001. The first bit is 1. In order to indicate the bit "1" the stain painter needs to randomly select a point on the 2nd spoke $d_2$ which is larger than the randomized point selected on spoke 1 ($d_2 > d_1 \rightarrow$ "1"). The randomized selection in the figure is $d_2 = 5$. The next bit in M2 is "0" therefore the construction of the stain should be such that the point on spoke 3 will be less the distance point on spoke 2: $d_3 < d_2 \rightarrow$ "0". The third bit in M2 is "1" so now $d_4 > d_3$ (as indeed is the case 5>2). And so it continues through all the spokes. The resulting entropic stain is defined through the connecting lines between the successive distance points on the spokes. The stain painter will compute the area enclosed by these connecting bars, A. If A falls within the limits of the low and how values for the stain area ($A_{min} \leq A \leq A_{max}$), then the operation is complete. A stain as desired is drawn and it carries the required subliminal message. If the resulting area A is outside the limits then, the painter adjusts the selection of distance points on the spokes according to the results, and for each adjustment the above adherence to the rules for writing M2 is practiced. At the end a desired stain is drawn and it carries the right M2 message. The reader of the combined messages will read the entropic message as discussed, and will read the subliminal message A2 according to the rules. Since $d_2>d_1$ then the reader will conclude that the first bit in M2 is "1". Similarly the reader will conclude that the second bit is "0" because $d_3<d_2$, and so on, reading through the entire stain. (note: the term stain is used here to identify a lump of one of the two or more colors that comprise the entropic message). If M2 is short and does not require all the spokes then the writer can use the option of keeping the next distance the same: $d_i=d_{i+1}$, for as many i values as necessary, or by adding some trailing zeros to M2. In the case where the message is longer then the writer could always add more spokes, or use the next strain to add more message. The framework of the spoke can be priori defined through defining an arbitrary center, an arbitrary r value, and setting up a fixed angle between successive spokes $\alpha=2\pi/r$.

INTRODUCTION

Shapeless surfaces exhibit randomized shapes that on one hand define a shapeless language and on the other hand leave an attractive impression on their human observer. Thereby opening the door to countless applications of unique utility and worth. Some are presented here.

The presented applications are divided to (i) artistic impressions, and (ii) effective communication.

Artistic Impressions

We identify the following categories:
1. surface painting 2. 3D applications 3. Food Preparation 4. psychological insight The basis for the artistic impression of the shapeless alphabet is the idea that a shapeless script is comprised of letters of which the shape and the geometry are no critical. This is quite surprising because it is opposite every other written alphabet: Latin, Hebrew, Arabic, Russian, India, music notes—all are alphabets comprised of shape specific letters. By contrast the shapeless alphabet is made up of letters that can choose their shape randomly, suggestively, alluringly—but unrelated to their main message. Historically when a new language shows up, it brings along a variety of new applications that could not have been carried out before. This is no different. The actual shapes of the Shapeless alphabet can be set up to be of great interest.

Surface Painting

We consider disturbing the monotony of a surface painted with a single color. This can be done by choosing two colors of great proximity. They are almost of the same shade, but still different. How different is a matter of taste. Using the Shapeless alphabet one can write a message with these two colors. The message here may not be of great interest, what is of interest is the random nature of the geometry of the letters. Since shape carries no linguistic meaning, it can be used to tease, to raise interest. If the 'stains' of the two colors appear random then they pop out in shapes that remind each of us something else, but keeps all of us focused and not bored.

This applies to painted walls, painted painting, painted clothing, painted brochure etc.

3D Applications

A Shapeless mass will read the same from any external surface and internal surface. This can be used to mark a piece of matter to offer strong counterfeit resustabce.

Food Preparation

Many synthetic foodstuff are monotonous and dis-appetizing. The Shapeless alphabet will create interest in the visuality of the foodstuff. For example monotonous hamburger real or artificial have steady quickly boring appearance. Using entropic alphabet we keep interest high and appetite on the go. This is of great importance as more and more actual meat and fish is replaced with synthetic alternatives, and variety and appetizing is important. It may turn the lot of an artificial food company.

Effective Communications

We identify the following categories:
1. emergency communication 2. industrial marking 3. traffic control 4. Cryptographic and stenographic applications

Emergency Communication

The entropic alphabet is resilient against a moderate amount of dirt and coloring of the written surface, and is readable despite difficult geometry between the surface and its reader, and therefore it should be considered as a means for emergency communication. Also the message is passed through direct line of communication, mostly on visual terms, and thus is independent of GPS and the Internet. It will work in states of emergency where there are no cell towers, and poor or non existent internet.

We identify several categories:
1. alerting rescuers 2. network alternatives

Alerting Rescuers

We describe the following cases:
1. lost in sea 2. lost on land

An individual or a party lost in sea, in a forest, or a desert, deprived of cellular and internet communication will be able to fly an entropic balloon. A balloon that is entropically marked to alert either intending searchers, or happenstance by passers. The advantage of the balloon is that it may be raised to high attitude and so be visible through larger distances, and since the message is printed there using the entropic language, it will be clearly read regardless of the direction of view of the party that notices the balloon.

There might be an agreed upon language to be understood by the rescuer, or it may be an ad-hoc message. In the simple case, it would be static, in a more sophisticated form the message will be dynamic—namely the graphics on the balloon will change with time and convey a dynamic message to its reader.

The balloon solution might also be used by two lost parties to find each other.

The Entropic Balloon

The entropic balloon is raised out of a contraption which includes a cartridge of a compressed light gas, like helium, a folded balloon, a tether—a rope connecting the raised balloon to the raising point on the ground or on the boat. The contraption includes a wrapper, envelope, and an activator mechanism. Travelers take this contraption along, and activate it when they wish to be discovered and rescued. Upon activation, the wrapper opens up, the gas cartridge inflates the folded balloon, and the balloon, lighter than air, is rising above the rising traveler. If it is windy the balloon is pulled to one side away from its user, but otherwise, its location points directly down to its activator.

In the simplest way, the message on the balloon is seen from any direction, interpreted as SOS rescue call, and rescue of activated.

A more sophisticated balloon also has a camera below the bloom, The camera has a string of lenses so that its can see from all directions. A rescuer spotting the first balloon will communicate to it using entropic alphabet over it's own balloon. The multilens camera from the first balloon will read the reply, interpret through its built it electronics and communicate it to the raiser of the first balloon through a readout screen which is part of the balloon contraption.

Another add on sophistication for the balloon is the option to communicate dynamically. This can be done by constructing the balloon from a fabric that reflects light shinning on it from one direction, to the other direction. The bloom will have in its center either a multi lens lamp, or a rotating lamp, or a combination thereto. The balloon activator will type in a message at a special console in the balloon contraption. This message will be translated through the computing device which is part of the contraption. the translation will say the message typed by the user to a sequence of entropic letters that would recycle in the contraption as the message manifests itself as a dynamic lights shone from the center light sources to the surrounding, inflated bloom fabric. The light shining from within the balloon will be visible as an entropic message on the balloon, readable by an approaching rescuer. And so the two parties will be able to communicate with each other.

This solution also can be used by two lost parties trying to find each other.

Rescue Options

Anticipating lost parties to raise a balloon, rescuers will comb the area looking for one. The search can be added by one or more drones equipped with cameras, and hanging balloons. The hanging balloon will be used to write dynamic messages on a round balloon dragged by the drone. These rescue balloons can also be used to communicate important messages to one or more lonely travelers who may or may not have been lost, but with whom there is no other communication channel.

Network Alternatives

Applicable in situations where (i) network is slow, unreliable, or inoperative, or (ii) when one wishes to avoid using the network, perhaps to communicate without drawing attention, as may be a case in law enforcement or a military conflict.

Shapeless communication can transfer between two stations, or more. It can take place through a full network of nodes which have at least one direct eye contact, vision line to another node in the network. Such an array of nodes can use shapeless communication over an extended area, as long as any node sees at least another node.

The network alternative communication can take place with a 360 degree exposure where each node writes its message on a flying balloon or a ball shape screen so it can be visible from any direction. alternatively for some users the nodes will display the shapeless message on a careful directed screen, perhaps even within a protective sleeve that only from a given direction it can be seen, so the messages go between carefully placed communicators, invisible to others.

Industrial Marking

Several categories:
1. item spray 2. package marking 3. conveyer applications

Item Spray

Using a shapeless message sprayer one could spray lumber, cartoons, instruments etc. The spray should be nontoxic and washable. It is a fast way to mark items that belong to a project or a group of some sort. The sprayer is marked through a keyboard and the written message is then translated to an entropic mixture that is readily sprayed in any surface, including curved and wrinkled ones.

Package Marking more and more packaged are being shipped all over the world as online commerce takes off. Entropic marking will prove efficient and effective. Identification symbols may be translated to entropic labels and entropic sprays. These messages can be lavishly attached to the handled packages. As the packages move and tumble through their various stations, an entropic camera reads these message despite awkward geometric configuration between the package and the camera.

Rails and Conveyor Applications

More and more packages are moved around on rails and conveyors where they are read and steered to one direction or another. This process will be more efficient when the label is entropic and can be read from various directions.

The entropic labeling will allow efficient shapes for the conveyed packages. Options: (i) cylinder, (ii) sphere.

Cylinder will ready be move ahead on a slight slope. As they role on the conveyor their entropic message stays the same because it is unified for the entire envelope of the cylinder. The system then knows at any moment where every piece is, and how to steer it.

Spheres: what is true for cylinder is even more true for spheres. Cylinder must be limited to move and roll on rails of bounding width, and they all must of same width (desirably). Spheres by contrast roll ahead on a wide conveyor, so the same conveyor will work for a variety of sizes of spheres. Both the sphere and the cylinder will project the same message regardless which side is up and which is down. The message may wrapped on the items or sprayed on them.

Traffic Control car roofs and truck roofs may be marked with an entropic message to be recognized by entropic cameras. This is much better than following traffic through car tags. it can be applied to special vehicles first. For example: vehicles which carry hazardous material, vehicles which carry money and other valuables between banks etc, ambulances, police cars, or perhaps mandate the suspects of some criminal activity mark their car on top to be identified on the road.

The entropic cameras can be mounted on bridges, on poles, on buildings, and can be installed in drones flying over a particular area.

Traffic control may apply to air traffic as an alternative to electromagnetic normal connectivity. The control tower may be mounded with a dome which in turn broadcasts and entropic message.

Cryptographic and Steganographic Applications

The entropic language can be extended to three message levels: Message $M_0$ is the front message, written in geometric letters (shape determined letters). The way $M_0$ is written allows one to use the Shapeless language to incorporate into $M_0$, another message $M_1$. Because $M_1$ is written via a shapeless alphabet, then the actual shape of letters can be used to communicate a third $M_2$ message.

The three messages $M_0$, $M_1$, and $M_2$ may or may not be related. The three messages are all fused into one expression, so they are tied to each other. This inexorable connection gives rise to various applications: (i) message signing, (ii) message double signing, (iii) drowning, (iv) subliminal channel.

Operations

Message $M_0$ is written via a regular geometric alphabet. The markings of the letters of $M_0$ are comprised of two or more distinct colors, arrayed according to an agreed upon shapeless alphabet, where the colors are so close that for the human eye they look like one color, but for a normal digital camera, the two colors are distinct, and their distribution defines a second language $M_1$.

$M_1$ is written as 'stains' of one color (insert color) marked on the background of the other color. The size of the stains and their proximity to one another determine the reading of $M_1$, not their specific geometry, this allows one to draw those stains in a geometry that would carry the third language $M_2$.

There are various ways to mark $M_2$ on $M_1$. We present one.

Contour Zig-Zagging

In this method one aims to draw a randomized stain of area between $A_{min}$ to $A_{max}$, but with no particular shape desired.

This can be done through a method called 'randomized inflation'. In this method a stain is marked by r points on r spokes emanating from a center. The r spots are strung together through r straight lines leading from one spoke to the next. When the stain is done, it is defined by r distances $d_1, d_2, \ldots d_r$ on the r spokes. These r distance values then serve as a basis for $M_2$. Starting from the first spot i=1, one evaluates $d_i$ versus $d_j$, for j=i+1. If $d_j > d_i$ then the first bit in $M_2$ is "1". If $d_j < d_i$ then the first bit in $M_2$ is "0". If $d_i = d_j$ then no bit is recorded. This comparison continue for i=1, 2, ... (r−1). (the exact recipe can vary, of course). As a result the stain built over r spokes may register a message $M_2$ comprised of r bits. The number of spokes, and their angels may be part of a secret communication key, to conceal the content of $M_2$.

Since the drawer of the stain has the full freedom to decide how much higher $d_j$ is relative to $d_i$, it turns out that the drawer of the stain has sufficient degree of freedom to draw a stain that would give its due contribution to $M_1$ while abiding by a given message $M_2$. In other words, one could pain a stain of a desired size and give it a randomized appearance, and do all that while setting the distance markings on the spokes so that that $M_2$ will be the exact bit message one would like it to say.

The framework of spokes may be of an arbitrary number r of spokes. It may have arbitrary even secret angles between the spokes, it may be mathematically defined over an arbitrary stain drawing center with the first spoke horizontal drawn from the center to the right, and the remaining (r−1) spokes are separated each by the angle $\alpha = 2\pi/r$.

Randomized Inflation

In this method one aims to draw a stain of a particular color so that it registers a stain area A relative to a low and high (arbitrary) limits:

$$A_{min} \leq A \leq A_{max}$$

The painter does so over a framework of r spokes. First the painter chooses a random distance $d_i$ for each spoke of the r spokes. Based on the r spots, the painter defines a 'stain' via the r connecting straight lines among the r spokes. This stain has the area A'. If A' falls between the high and low limits above then, the stain is properly drawn. If $A' < A_{min}$, then the painter increases the values of distance markings $d_1, d_2, \ldots d_r$ in a randomized way. If $A' > A_{max}$ then the painter decreases the values of the the distance markings $d_1, d_2, \ldots d_r$, and the painter repeats one of these steps until the area A fits between the high and low limits.

This method can be modified a bit so that a given bit string (message $M_2$) is properly written on the r spokes. This can be done by starting with spoke 1 and continuing to look for a randomized value for spoke 2, so that the relation between $d_2$ and $d_1$ will reflect the message to be written, $M_2$. Because the painter can decide how much larger or how much smaller the next spoke distance will be, then the painter can achieve its goal with respect to $M_1$ while honoring its desire to mark $M_2$ on the same stain.

Applications

The plain message may be entropically signed by the writer of the plain message. This can be done by writing the entropic message with two very similar colors that the eye does not distinguish, but the camera does. The third message, $M_2$, may be used to double sign the plain message or to add a supervisory signature of some sort. Of special interest is the drowning method, wherein $M_2$ is used to indicate to the intended reader that a given message both in the entropic level and in the plain level is not to be regarded, it is designed to confuse the cryptanalyst. E.g the plain message will read "I will never take a given action". The message will be properly signed by its maker as indicated on the entropic message, but then the third message, $M_2$ will say that the word "never" is a political lie, and the sentence should read: "I will take a given action". More readily the real message may be drowned in a large stream of spewing conversation, and M2 will point out what in the large stream is to be heeded. It is of course always possible to have no connection between $M_0$, $M_1$ and $M_2$.

Overview of the Invention

This invention describes a system for tracking, finding, monitoring parties in the outdoors, comprised of a balloon inflated by Helium or any other safe light gas, which is tethered to its owner, and where the balloon is marked of all sides with a specific entropic (shapeless) message where two or more colors are painted in a given ratio, and the mixing (entropy) level of the two or more colors is a specific value such that the combination of ratio and degree of entropy identify the so painted surface as a specific written letter of a special entropic alphabet, and that the painted surface of the balloon can be read from any direction; so that the very visible flying balloon will point to the spot where the owner of this balloon is to be found, this point may be deep in the forest, lost in the desert, on high seas, anywhere people move about.

The described system is where the user is equipped with a kit including a cartridge of compressed light safe gas, and upon activation the balloon is inflated and rises.

The described system is where the balloon is equipped with a camera that communicates to the user on the ground, and is used to read entropic messages from others.

The described system is where the center of the inflated balloon includes a light projector that projects an entropic message to the internal surface of the balloon and where the surface of the balloon is made of translucent material so that the colors and shapes projected from the inside of the balloon are visible from the outside, and where the projector may projects a dynamic message, as it is instructed from an entropic message generator on the ground.

The described system is also where the readers of the flying balloon entropic message are drones.

This invention also describes a method to paint surfaces with an entropic message comprised of two very similar colors, so that the surface seems to be of a single fixed color, but a sense of randomness and interest is arising from the surface; such marking is applicable to painting walls, marking pages in brochures and pamphlets, coloring dresses and items of clothing.

The described method is where the colors are distinct not similar and applied to foodstuff such that the edible dish is optimized in terms of the ratios between the ingredients and the degree of their mixing, to make the dish as appetizing as possible.

This invention further describes a method to sign printed messages on posters, walls and brochure, by marking the written language with an entropic message of similar colors that no distinction is visible to the naked eye, but is visible to a camera, and where the entropic message is the hash of the plain message, after it has been encrypted with the private key of the declared announcer of this message, such that when the camera reads the entropic message it will decrypt it using the pubic key of the author, and compare the decrypted hash to the hash as calculated by the reader of the plain message, so that upon a match being found, the plain message is considered authenticated as per the identity of its author.

What is claimed is:

1. A system for tracking, finding, monitoring, and rescuing parties in the outdoors, when electronic communication is unavailable, and when it is difficult to spot people on the ground because of forestry or topography,
   the system effects a message sent from a sender having no other effective means to communicate to monitors or rescuers, and a viewer who uses optics to detect the sender's location and their message, comprising:
   (i) a balloon inflated by Helium, raised up into the air; the balloon being tethered with a rope to the sender who raises it, to be discovered by the viewer; the viewer is being located either on the ground or in the air, or on water, and where the surface of the balloon is marked with a specific entropic (shape unspecified) message where two or more colors are painted in
   a. a specific ratio, and
   b. a specific degree of mixing (degree of entropy)
   wherein the combination of ratio and degree of entropy correlate to a code taken from an agreed-upon code book, and where the ratio and the degree of entropy are communicated to a viewer looking at the balloon from any direction, and having only a partial view of the surface of the balloon;
   this code being the message written by the sender on the balloon and properly interpreted by the viewer;
   (ii) the viewer is located in sight range of the balloon equipped with
   c. a digital camera that captures a surface area of the balloon,
   d. a computing device used by the viewer, interpreting the picture taken by the camera, and thereby the message raised by the user is communicated to the viewer.

2. The system in claim 1 wherein the user is equipped with a kit including a cartridge of compressed Helium, which is used to inflate the balloon.

3. The system in claim 1 wherein the balloon is fitted with a camera that communicates to a computing device operated by the sender, enabling the sender to become a viewer of another sender.

4. The system in claim 1 where the center of the inflated balloon includes a light projector that projects an entropic message to the internal surface of the balloon and where the surface of the balloon is made of translucent material so that the colors and shapes projected from the inside of the balloon are visible from the outside, especially at night, and where the light projector will project a succession of code-book messages onto the surface of the balloon.

5. The system in claim 1 where the viewer is a system comprising a digital camera, and a computing device fitted in a drone that maintains electronic communication with its operators.

6. The system in claim 5 where a drone operator, while being a viewer, serves also as a second sender, tethered to a second balloon, which is captured by the camera of the first sender.

7. A method to replace a monotone color of a surface with entropic painting wherein two distinct colors A and B that are painted on a surface in a way where in any given area of the surface, above a certain minimum area size, the ratio between the surface portion of A and the surface portion of B is the same, and also the degree of mixing between A areas (A stains) and B areas (B stains) is the same, thereby encoding a message through entropic painting, applied to
   uniforms and other clothing in order to identify the wearer of such clothing by a digital camera connected to a computing device.

8. The method in claim 7 applied to painted labels, and packages.

9. A method to sign printed messages on documents, posters, walls and brochures, by replacing the monochrome ink with a mixture of two inks of very similar shade of a selected color, to be registered as a single color by the human eye, but be identified as two distinct shades by a digital camera,
   in a way where in any given area of the surface, above a certain minimum area size, the ratio between the surface portion of one shade, and the surface portion of the other shade is the same, and also the degree of mixing between the two shades is the same, thereby writing a second (entropic) message onto the ink arrangement of the printed letters, and where the printed letters express a different message, (the first message), the second message is the encrypted hash of the first message, where the encrypted hash is generated by the private key of the writer of the first message, and, where the reader of the printed surface will authenticate the writer of the first message by using the writer's public key to verify that the encrypted hash written as the second message corresponds to the hash of the first message.

10. The method in claim 9 where the entropic message is comprised of mixed stains of two or more colors and where the exact shape of a stain is used to encode a subliminal message carried by the entropic message.

11. The method of claim 9 applied over digitally presented printed letters.

\* \* \* \* \*